United States Patent
Piepenburg

(10) Patent No.: US 10,138,644 B1
(45) Date of Patent: Nov. 27, 2018

(54) SKIMMER BASKET BARRIER SYSTEM

(71) Applicant: Gary Piepenburg, Rockwall, TX (US)

(72) Inventor: Gary Piepenburg, Rockwall, TX (US)

( * ) Notice: Subject to any disclaimer, the term of this patent is extended or adjusted under 35 U.S.C. 154(b) by 440 days.

(21) Appl. No.: 14/924,251

(22) Filed: Oct. 27, 2015

Related U.S. Application Data

(60) Provisional application No. 62/069,089, filed on Oct. 27, 2014.

(51) Int. Cl.
*E04H 4/12* (2006.01)
*C02F 1/00* (2006.01)
*B01D 29/11* (2006.01)
*C02F 103/42* (2006.01)

(52) U.S. Cl.
CPC ......... *E04H 4/1272* (2013.01); *B01D 29/114* (2013.01); *C02F 1/001* (2013.01); *C02F 2103/42* (2013.01)

(58) Field of Classification Search
None
See application file for complete search history.

(56) References Cited

U.S. PATENT DOCUMENTS

| | | | |
|---|---|---|---|
| 7,455,766 B1 * | 11/2008 | Lewis ................. | E03F 1/00 210/163 |
| 7,594,997 B1 * | 9/2009 | Kazarian ............. | E04H 4/1254 210/167.19 |
| D619,773 S * | 7/2010 | Diermayer .......... | D32/35 |
| 2005/0055898 A1 * | 3/2005 | Georgeff ............. | E04H 4/1254 52/169.6 |

* cited by examiner

*Primary Examiner* — Benjamin M Kurtz
(74) *Attorney, Agent, or Firm* — Eldredge Law Firm; Richard Eldredge; Beth Felix

(57) ABSTRACT

A filtration barrier system includes an elongated body configured to rest flat on a top surface of pool walkway surface and a perforated cylindrical filtration head integrally attached to the elongated body, the cylindrical filtration head having a length extending from a first end and a second end, and forming a hollow cavity. The perforated cylindrical filtration head completely covers an opening in fluid communication with a filtration basket and configured to prevent floating debris from entering into the opening.

5 Claims, 4 Drawing Sheets

SKIMMER BASKET BARRIER SYSTEM

BACKGROUND

1. Field of the Invention

The present invention relates generally to fluid filtration systems, and more specifically, to a swimming pool filtration system.

2. Description of Related Art

Swimming pool fluid filtration systems are well known in the art and are effective means to filter unwanted debris from the pool water. For example, FIG. 1A depicts a side view of a conventional pool filtration system 101 operably associated with the pool skimmer housing 103 configured to carry a skimmer basket 105 therein. During use, the filtration system 101 is configured to collect debris 100, for example leaves, from the pool water. In the exemplary embodiment, the housing 103 is supported via a walkway 107 that surrounds the body of pool water. The walkway 107 and side surface 109 of the pool form an opening 111 in communication with a pivoting gate 113.

During operation, the water flows through opening 111, pass gate 113, and enters housing 103. The debris 100 from the pool water is thereafter collected in skimmer basket 105, which in turn can be retrieved by removing lid 115 from the housing 103.

A common disadvantage associated with system 101 is the limited use. For example, as depicted in FIG. 1A, during the fall months, the debris significantly increases, which in turn clogs the opening 111. It should be understood that a clogged opening 111 prevents system 101 from effectively filtering the debris from the water.

Although great strides have been made in the area of pool filtration systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
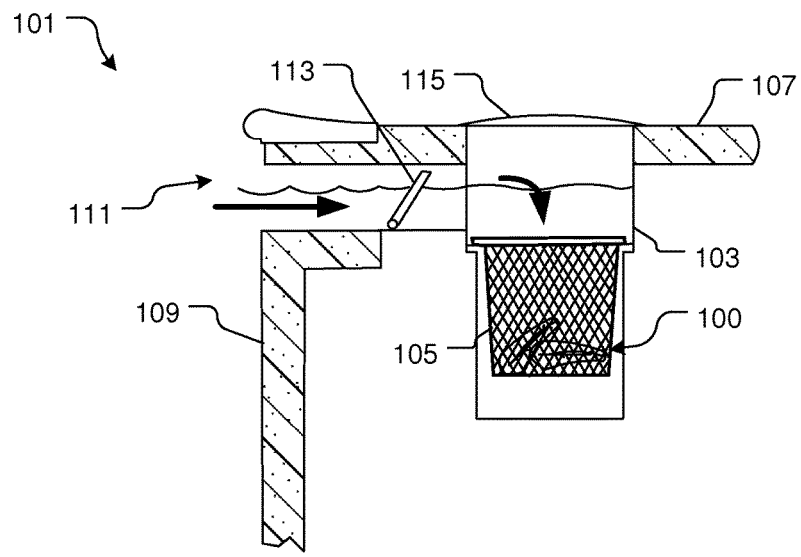
FIGS. 1A and 1B are side views of a conventional pool fluid filtration system.
Figure 1B:
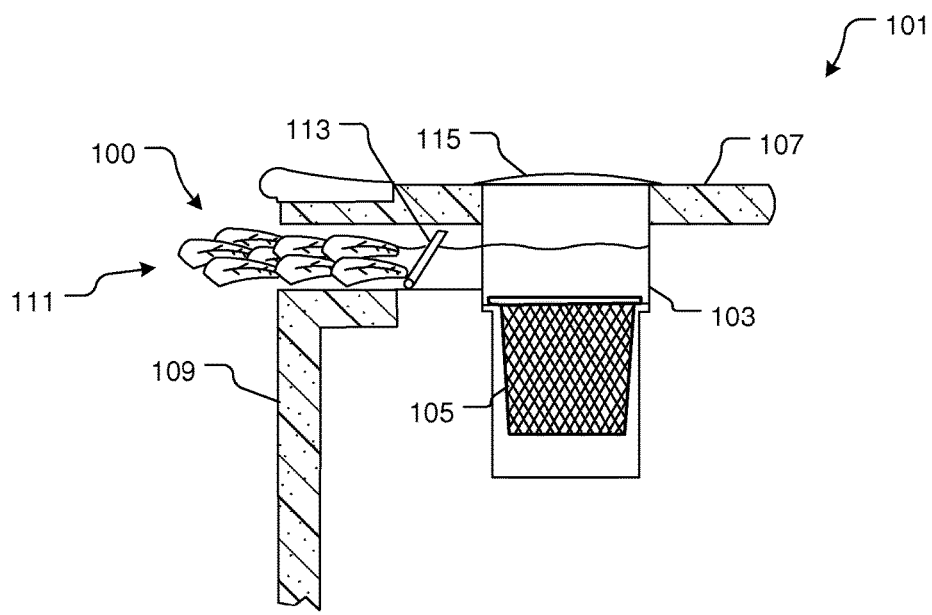

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pool filtration systems. Specifically, the system of the present application is configured to provide rapid and effective means filter the debris from entering into the skimmer housing. This feature keeps the opening unclogged and allows the skimmer basket to remove undesired debris from the pool water. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
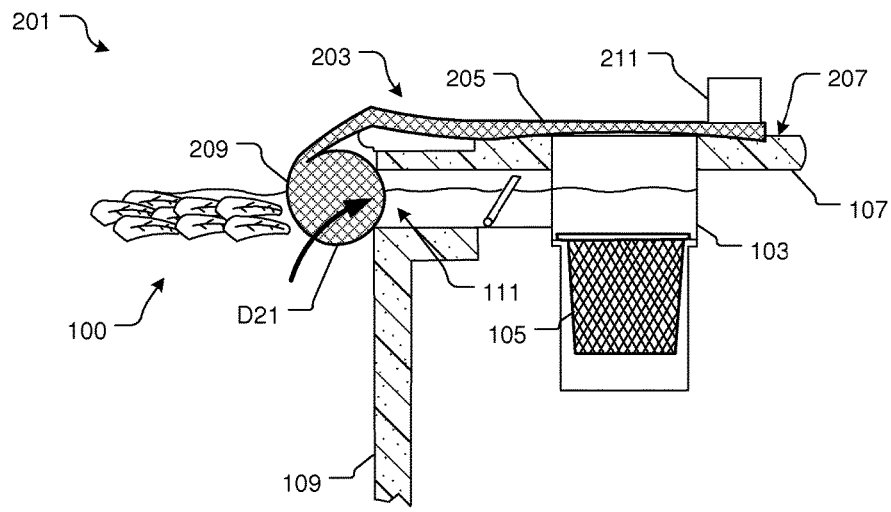
FIG. 2 is a side view of a pool fluid filtration system in accordance with a preferred embodiment of the present application.

Referring now to the drawings wherein like reference characters identify corresponding or similar elements throughout the several views, FIG. 2 depicts a simplified side view of a pool filtration system 201 in accordance with a preferred embodiment of the present application. It will be appreciated that the system 201 overcomes one of more of the above-listed problems commonly associated with the conventional pool filtration systems.

In the contemplated embodiment, system 201 is provided with a perforated barrier 203 configured to keep the debris 100 from entering into the opening 111. Barrier 203 includes a relatively flat elongated body 205 configured to rest on a top surface 207 of walkway 107. The body 205 is preferably integrally attached to a circular filtration head 209.

Figure 6:
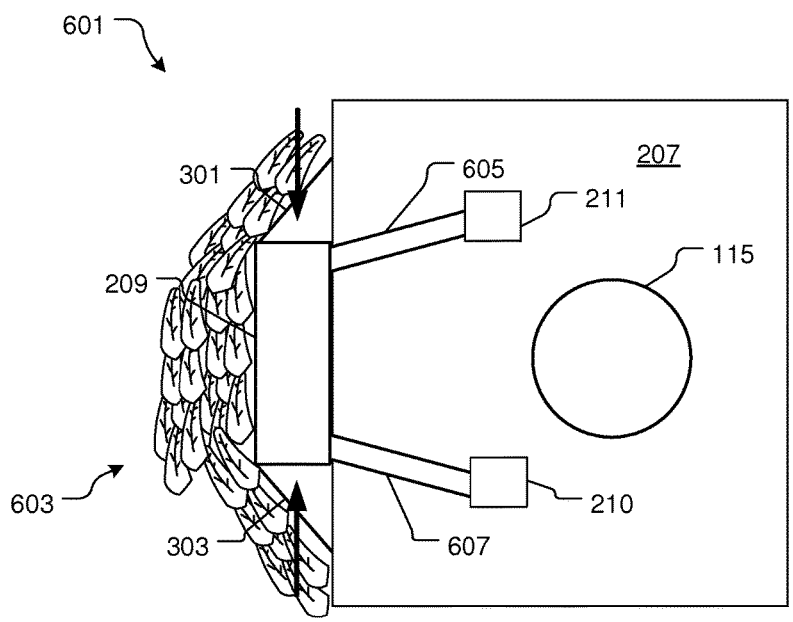
FIG. 6 is a top view of a system in accordance with an alternative embodiment of the present application.

In the preferred embodiment, both body 205 and head are perforated; however, it will be appreciated that body 205 could be composed of a non-perforated material, e.g., an elongated solid strip (see, FIG. 6). During assembly, the body 205 is merely placed on surface 207 and secured thereto via one or more weights 210, 211. The head 209 is configured to cover the entire opening 111 and allows water to pass therethrough while keeping the debris at a distance therefrom.

Although head 209 is depicted as a circular tubular shape, it will be appreciated that other shapes are also contemplated in alternative embodiments. One of the unique features of head 209 is the ability to keep the floating debris at a distance from the opening 111 while also allowing the water to pass therethrough, as depicted by arrow D21. In the contemplated embodiment, head 209 is composed of an elastomeric material and includes cross-hatching openings; however, it will be appreciated that alternative embodiments could include different perforation shapes and dimensions. In the exemplary embodiment, the openings of the cross-hatching smaller than the opening of the skimmer basket perforated openings.

Figure 3:
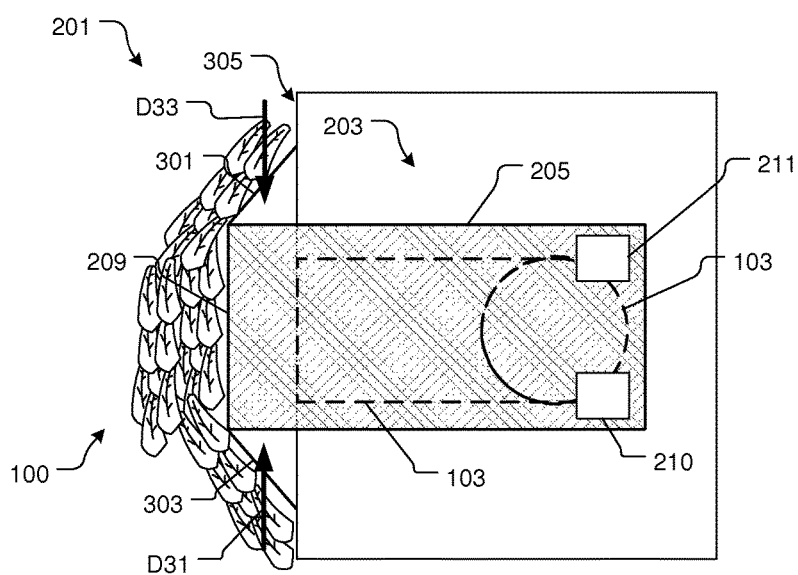
FIG. 3 is a top view of the system of FIG. 2.
Figure 4A:
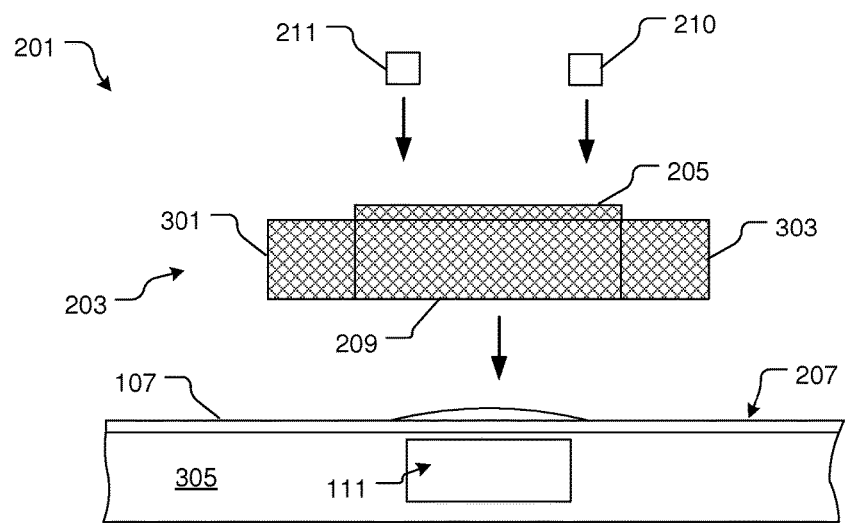
FIGS. 4A and 4B are front views of the system of FIG. 2.
Figure 4B:
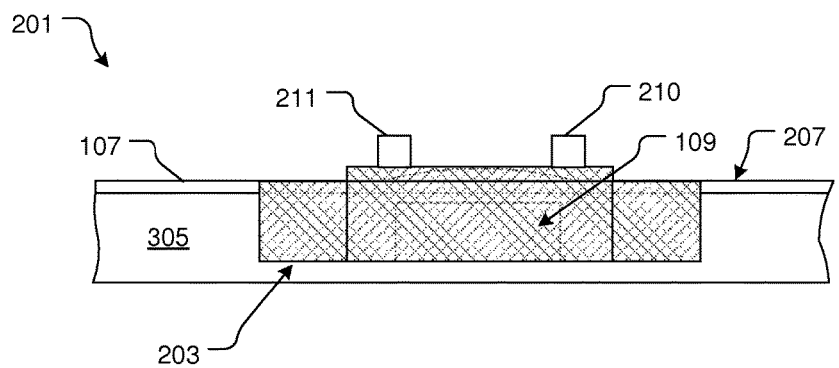

In FIG. 3, a top view of system 201 is shown. As depicted, system 203 is further provided with two side arms 301, 303 attached to head 209. It should be understood that side arms 301, 303 are optional features and provide further filtration of the debris 100 from the pool water. As depicted, the water also enters through the perforated side arms 301, 303, as shown with arrows D31, D33. In the contemplated embodiment, both head 209 and side arms 301, 303 com into contact with the side surface 305 of the side wall 109 and retained in this position via the body 205 secured in position via the weights 211. The disassembled and assembled views of system 201 are shown as front views in FIGS. 4A and 4B.

Figure 5:
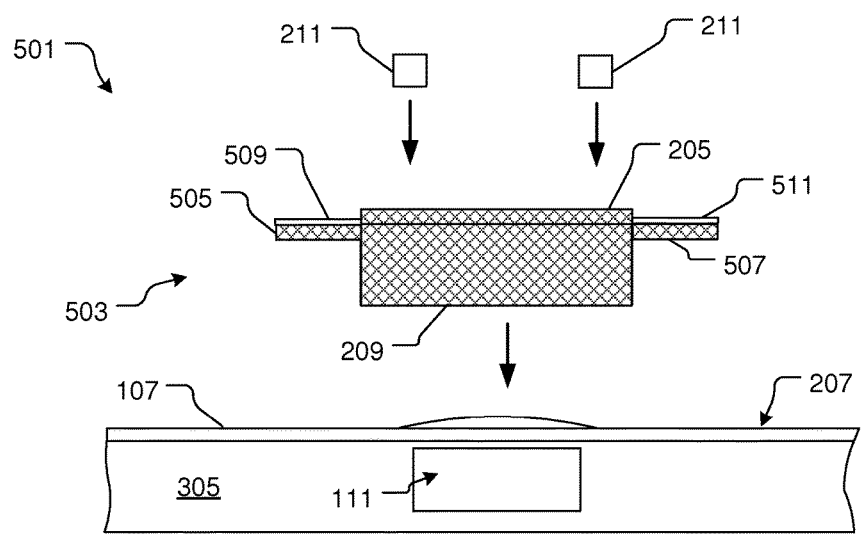
FIG. 5 is a front view of a system in accordance with an alternative embodiment of the present application.

Referring now to FIGS. 5 and 6 in the drawings, additional features are hereby contemplated. System 501 is substantially similar in form and function to system 201; however, system 501 includes a barrier 503 with arms 505, 507 having substantially lesser heights than the height of the head 209. In addition, it is also contemplated having ledges 509, 511 on respective arms 505, 507. It should be appreciated that the arms 505, 507 do not need to be perforated and could be manufactured as solid pieces of materials.

In FIG. 6, a system 601 is shown. Like system 501, the features of system 601 are substantially similar in form and function to the features of system 201. In this contemplated embodiment, barrier 603 is secured in position via two anchor straps 605, 607 integrally attached to head 209 and held on surface 207 via weights 210, 211. This features allows the user access to the skimmer housing via lid 115, which remains unblocked by the straps 605, 607.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A filtration barrier system for a filtration of a pool, comprising:

an elongated body configured to rest flat on a top surface of a pool walkway surface;
a perforated cylindrical filtration head integrally attached to the elongated body, the cylindrical filtration head having a length extending from a first end to a second end, and forming a hollow cavity;
a first perforated side arm rigidly attached to and extending from the first end of the filtration head and configured to engage with a front surface of the pool;
a first gap forming between the first perforated side arm, the front surface and the hollow cavity;
a second perforated side arm rigidly attached to and extending from the second end of the filtration head and configured to engage with the front surface of the pool; and
a second gap forming between the second perforated side arm, the front surface and the hollow cavity;
wherein the first perforated side arm and the second perforated side arm extend at an angle relative to the perforated cylindrical filtration head;
wherein the perforated cylindrical filtration head completely covers an opening in fluid communication with a filtration basket; and
wherein the perforated cylindrical filtration head is configured to prevent floating debris from entering into the opening.

2. The system of claim 1, wherein the elongated body is perforated.

3. The system of claim 1, further comprising:
an anchor secured to the elongated body.

4. The system of claim 1, wherein the elongated body is configured to extend over a filtration housing.

5. A filtration barrier system, comprising:
a perforated cylindrical filtration head having a length extending from a first end to a second end, and forming a hollow cavity, the filtration head being configured to rest along a side of a pool wall;
a first strap anchor flexibly attached to the filtration head;
a first perforated side arm rigidly attached to and extending from the first end of the filtration head and configured to engage with a front surface of the pool;
a first gap forming between the first perforated side arm, the front surface and the hollow cavity;
a second perforated side arm rigidly attached to and extending from the second end of the filtration head and configured to engage with the front surface of the pool; and
a second gap forming between the second perforated side arm, the front surface and the hollow cavity;
wherein the first perforated side arm and the second perforated side arm extend at an angle relative to the perforated cylindrical filtration head;
wherein the perforated cylindrical filtration head completely covers an opening in fluid communication with a filtration basket;
wherein the perforated cylindrical filtration head is configured to prevent floating debris from entering into the opening; and
wherein the first strap is configured to secure the filtration head in a fixed position.

* * * * *